United States Patent
Robertson

(10) Patent No.: US 10,994,221 B2
(45) Date of Patent: May 4, 2021

(54) SYSTEM AND METHOD FOR EXTRACTING HYDROCARBONS

(71) Applicant: THOMAS W. ROBERTSON, LLC, Havasu Lake, CA (US)

(72) Inventor: Thomas W. Robertson, Havasu Lake, CA (US)

(73) Assignee: Thomas W. Robertson, LLC, Havasu Lake, CA (US)

( * ) Notice: Subject to any disclaimer, the term of this patent is extended or adjusted under 35 U.S.C. 154(b) by 0 days.

(21) Appl. No.: 16/673,787

(22) Filed: Nov. 4, 2019

(65) Prior Publication Data

US 2021/0001246 A1    Jan. 7, 2021

Related U.S. Application Data

(60) Provisional application No. 62/869,425, filed on Jul. 1, 2019.

(51) Int. Cl.
| | |
|---|---|
| *B01D 11/02* | (2006.01) |
| *C02F 1/26* | (2006.01) |
| *C02F 1/00* | (2006.01) |
| *E21B 43/34* | (2006.01) |
| *B09C 1/02* | (2006.01) |
| *C02F 101/32* | (2006.01) |

(52) U.S. Cl.
CPC ...... *B01D 11/0226* (2013.01); *B01D 11/0284* (2013.01); *B01D 11/0288* (2013.01); *B09C 1/02* (2013.01); *C02F 1/004* (2013.01); *C02F 1/26* (2013.01); *E21B 43/34* (2013.01); *C02F 2101/32* (2013.01)

(58) Field of Classification Search
CPC ............ B01D 11/0226; B01D 11/0284; B01D 11/0288; B01D 11/02; B01D 11/0215; B01D 11/0269; B01D 11/0276; B01D 11/04; B01D 11/0426; B01D 11/0434; B01D 11/0446; B01D 11/0488; B01D 11/0492; B01D 21/00; B01D 21/0039; B01D 21/0087; B01D 21/009; B01D 21/02; B01D 21/24; B01D 21/2405; B01D 19/00; B01D 19/0042; B01D 19/0068; B01D 36/00; B01D 36/001; B01D 36/04; C02F 1/26; C02F 1/004; C02F 2101/32; C02F 1/04; C02F 9/00; B09C 1/02; B09C 1/00; E21B 43/34; B01F 1/0011; B01F 1/0022; B01F 7/02; B01F 7/021; B01F 7/022; B01F 7/08; B01F 7/087; B01F 9/02; B01F 9/16; B03B 9/00
USPC ............... 210/511, 634; 209/157; 405/128.1, 405/128.7, 128.75; 208/390, 391
See application file for complete search history.

(56) References Cited

U.S. PATENT DOCUMENTS

| | | | | |
|---|---|---|---|---|
| 2,847,282 A | * | 8/1958 | Dunning | ............... C01B 17/033 422/273 |
| 3,297,043 A | * | 1/1967 | Adams | ..................... B01J 19/20 134/60 |
| 3,895,958 A | * | 7/1975 | Gill | ........................ B08B 3/04 134/60 |

(Continued)

*Primary Examiner* — Joseph W Drodge
(74) *Attorney, Agent, or Firm* — David G. Henry, Sr.

(57) ABSTRACT

A system and method for extracting hydrocarbons utilizing recirculated washing medium to enhance efficiency. Some embodiments include a helical agitation member configured to promote extended contact between material containing hydrocarbons and a washing medium.

7 Claims, 6 Drawing Sheets

(56) References Cited

U.S. PATENT DOCUMENTS

| | | | | |
|---|---|---|---|---|
| 4,392,941 A * | 7/1983 | Roth | ............ | C10G 1/047 208/13 |
| 4,968,412 A * | 11/1990 | Guymon | ............ | C10G 1/04 208/390 |
| 5,268,128 A * | 12/1993 | Lahoda | ............ | G21F 9/04 209/18 |
| 5,269,906 A * | 12/1993 | Reynolds | ............ | B01D 17/00 208/13 |
| 5,409,605 A * | 4/1995 | Haley | ............ | C02F 11/00 210/199 |
| 5,922,277 A * | 7/1999 | Donhoff | ............ | B03B 9/02 209/18 |
| 6,123,483 A * | 9/2000 | Langenecker | ............ | B01D 15/00 210/619 |
| 6,689,925 B2 * | 2/2004 | Malhis | ............ | C10G 1/00 208/13 |
| 2006/0016760 A1* | 1/2006 | Bozak | ............ | C10G 1/047 210/708 |
| 2008/0110805 A1* | 5/2008 | Veltri | ............ | C10G 1/047 208/391 |
| 2013/0020235 A1* | 1/2013 | Filby | ............ | C10G 31/06 208/390 |
| 2015/0217210 A1* | 8/2015 | Itahashi | ............ | B01D 1/222 210/523 |
| 2017/0087608 A1* | 3/2017 | Loureiro Pecoraro | ............ | B01D 33/03 |

* cited by examiner

SYSTEM AND METHOD FOR EXTRACTING HYDROCARBONS

CITATION TO PRIOR APPLICATIONS

The present application claims priority to U.S. Provisional Application No. 62/869,425, titled "SYSTEM AND METHOD FOR EXTRACTING HYDROCARBONS" and filed on Jul. 1, 2019.

BACKGROUND OF THE INVENTION

The present invention relates generally to the extraction of hydrocarbons from dirt, sand, clay, water, or other substances in which they are unwanted.

Prior art approaches typically utilize hot water process and hydrocarbon-based solvents. Although myriad different approaches exist, each is expensive, consumes high amounts of energy, and lacks a full cleaning process evidenced by consistent residual waste materials.

U.S. Pat. No. 5,922,277 depicts one such prior art approach featuring numerous solvents (including those that are hydrocarbon-based) and heating systems to facilitate hydrocarbon extraction.

Similar prior art approaches more specifically face issues relating to: high water use, high heating costs, dangers relating to work with super-heated water, quickly worn out pipe, high emissions of volatile organic compounds ("VOC's"), clay remaining in the hydrocarbons and in the tailings (tar sands and others), the time for tailing ponds to settle (between 50-100 years), hydrocrackers becoming filled with clay resulting in regular shut down and maintenance requirements (common in Canada), water from froth generated during prior art processes that must be removed, diluents that must be added to hydrocarbons in order to be pumped (occurring with oil/tar sand especially), reclamation of land in the context of fines tailings (high retention of water in clay does not allow rapid settlement), daily monitoring of tailing ponds that must be monitored for 50 years after the final day of mining and extraction of hydrocarbons, the need for various types of water-foul-deterrent machines to be used to scare off the fowl (common in Canada), and more general, negative environmental impact resulting from inefficient handling of byproducts.

SUMMARY OF THE INVENTION

Embodiments of the present invention will most likely be used in the following applications amongst others: oilfields, oil sands cleanup, environmental cleanup, tailing ponds, drilling sites, tank farms, tank bottoms, yard cleanup, and contaminated dump sites.

In essence, the present invention is beneficially embodied in a mechanical apparatus interface and a natural washing medium used to extract hydrocarbons from dirt, sand, clay, and water. As compared to prior art approaches, practice of the present invention is designed to resolve or otherwise address the various concerns and issues identified above.

Embodiments of the present invention clean and recover hydrocarbons from dirt, sand, or clay more efficiently and economically, with considerably less environmental impact that the prior art. Further, such embodiments also require considerably less equipment and can be portable or stationary, as it is completely scalable. The washing medium is recycled on a continuous basis, and the water is cleaned and reused thus reducing the amount of water used—a common problem faced by prior art systems. The clay (or other starting material to be cleaned) is isolated from the hydrocarbons by embodiments of the present invention, and no tailing ponds are generated. Embodiments of the present invention feature a continuous throughput system that is almost entirely free of VOC's as it functions in a closed loop. The washing medium is recoverable and does not lose any of its constituents when used for hydrocarbon recovery because the medium: (1) does not mingle with the hydrocarbons; and (2) is non-miscible with water. Since the clay is isolated from the hydrocarbons, there is no waste to dispose of. Embodiments of the present invention result in clean spoils, clean hydrocarbons, clean washing medium, and clean water.

Certain embodiments of the present invention utilize screws and barrels to enhance cleaning efficiency as further described herein.

DETAILED DESCRIPTION OF THE INVENTION

Figure 1:
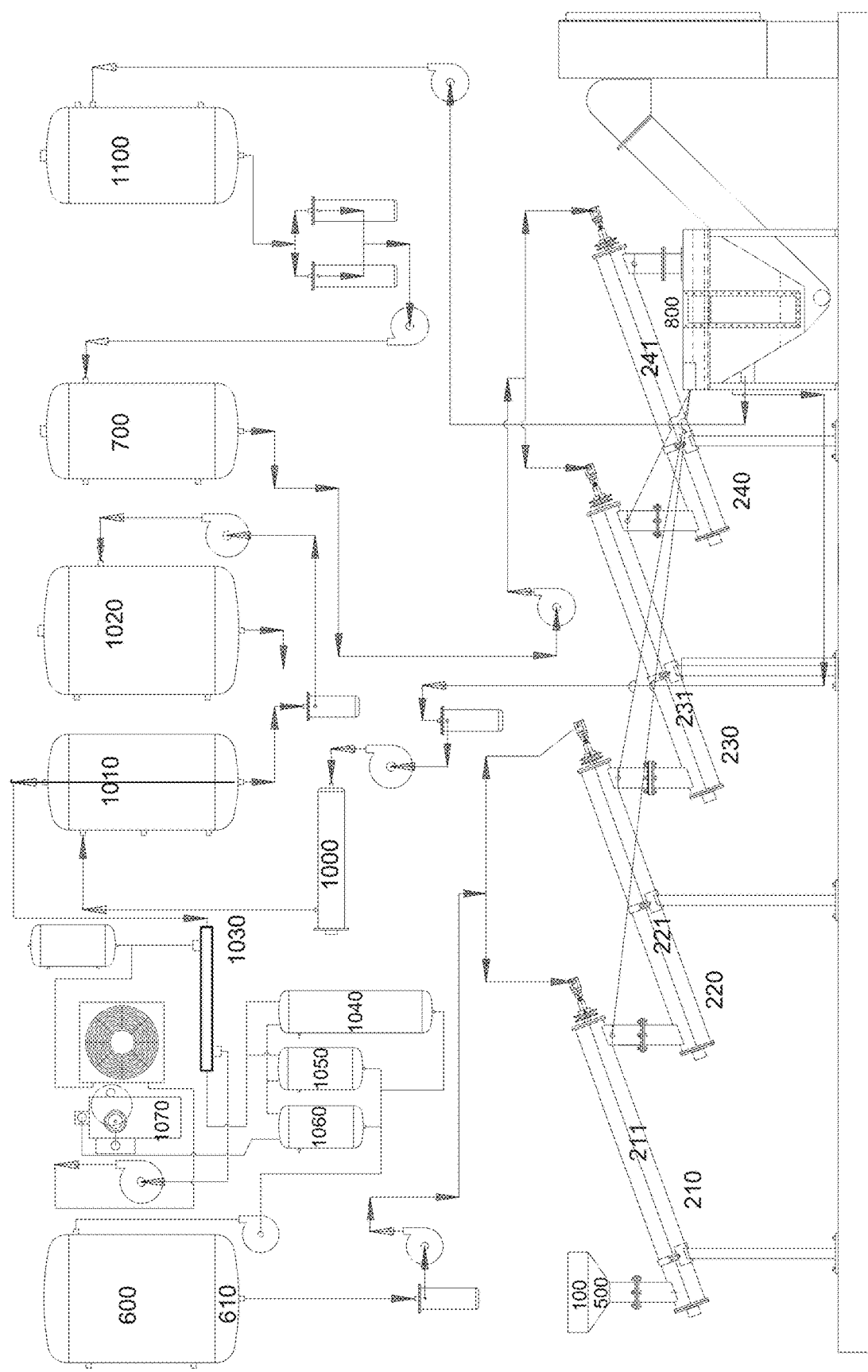
FIG. 1 is a flow diagram of one embodiment of the present invention.
Figure 2:
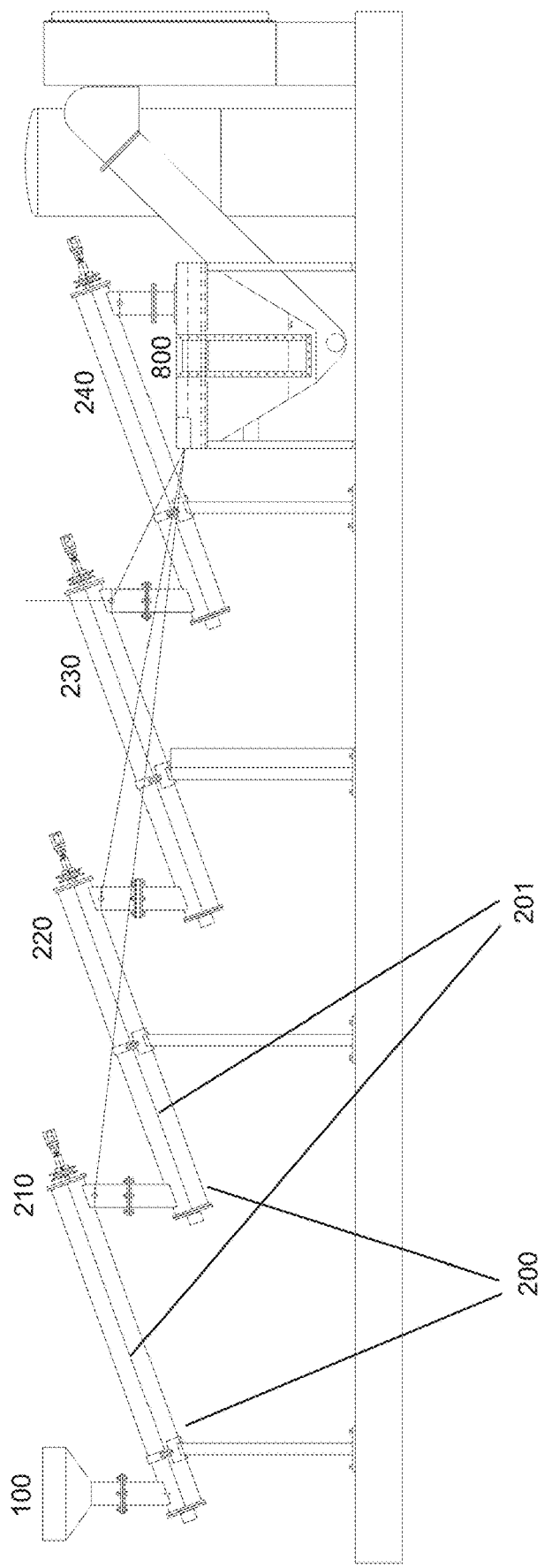
FIG. 2 is a right side view of the separation and rinse chambers of one embodiment of the present invention.
Figure 3:
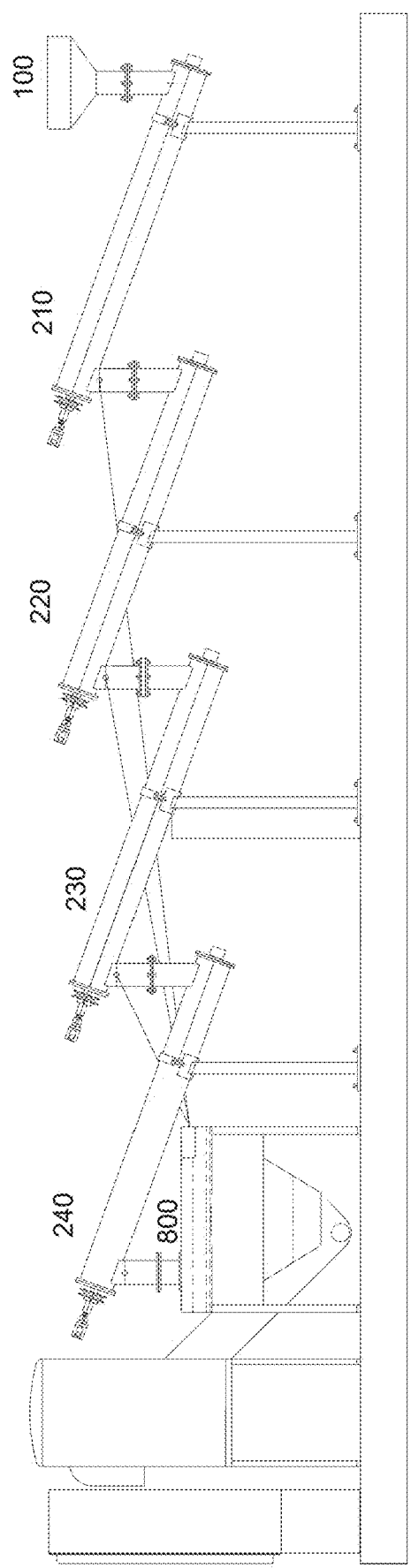
FIG. 3 is a left side view of the separation and rinse chambers of one embodiment of the present invention.
Figure 4:
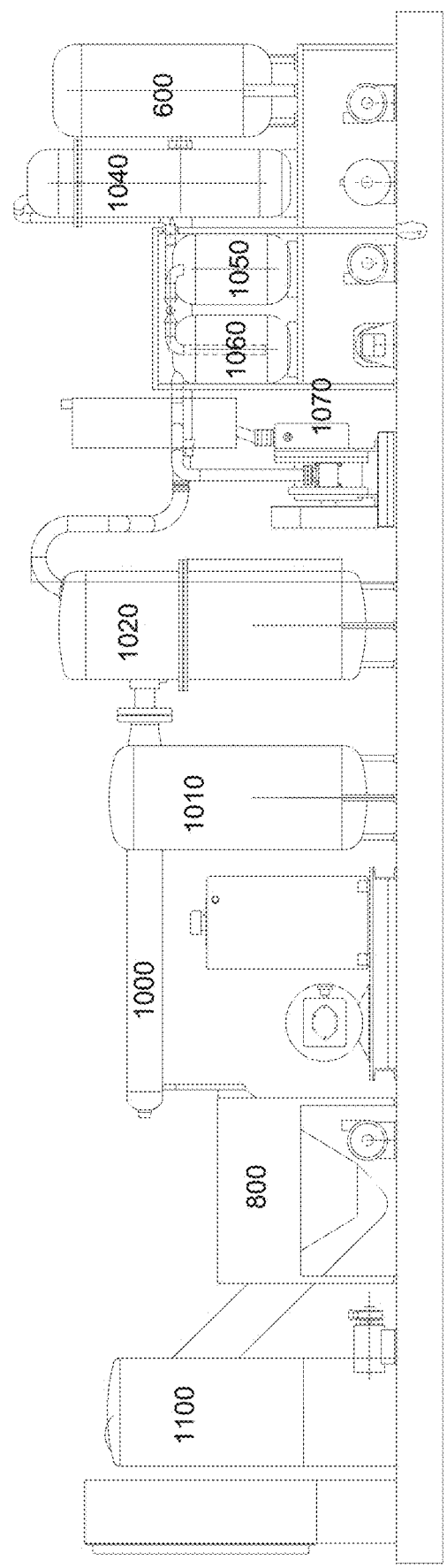
FIG. 4 is a left side view of the reservoirs and pumping mechanisms of one embodiment of the present invention.
Figure 5:
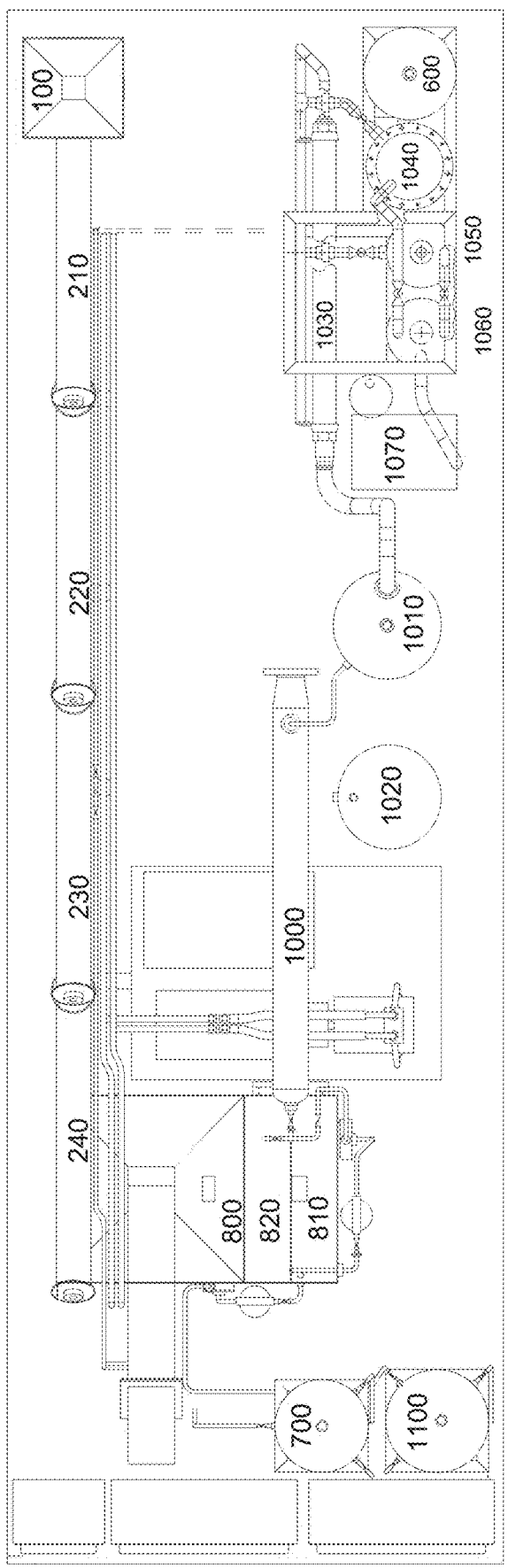
FIG. 5 is a top view of one embodiment of the present invention.
Figure 6:
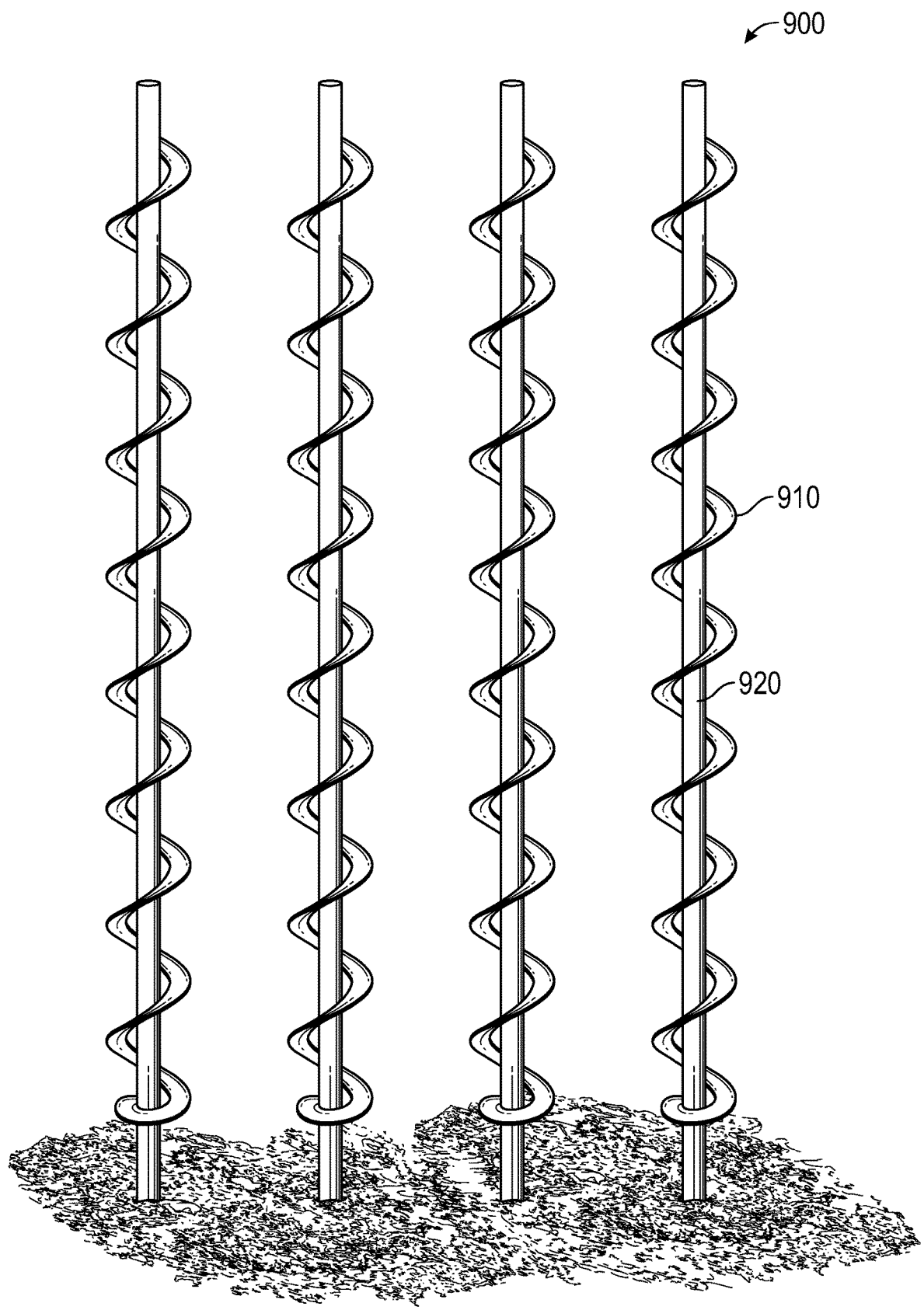
FIG. 6 is a front perspective view of an agitation member of one embodiment of the present invention.

This description, with references to the figures, presents non-limiting examples of embodiments of the present invention.

Certain embodiments of the present invention comprise a loading vessel 100, at least one separation chamber 200 wherein said at least one separation chamber comprises an agitation member 201, and a receiving vessel 800. In these embodiments, separation chamber 200 is substantially cylindrical in shape and positioned such that a first end of separation chamber 200 is fixed at a position that is lower relative to a second end of separation chamber 200. Loading vessel 100 can be coupled to said first end of said separation chamber 200 to allow for a starting material 500, to be loaded into separation chamber 200. Such embodiments may further include a washing medium supply reservoir 600 that is coupled to said second end of separation chamber 200 to allow for communication of a washing medium 610 from washing medium supply reservoir 600 to separation chamber 200.

FIGS. 1-5 depict a further embodiment of the present invention. In this embodiment, starting material 500 is contained within loading vessel 100, which feeds said material into a lower first end of first separation chamber 210. Washing medium supply reservoir 600 communicates a washing medium to an elevated second end of first separation chamber 210. A first separation chamber agitation member 211 is configured to cause starting material 500 to traverse an interior volume of first separation chamber 210 from the lower first end toward said elevated second end. Agitation member 211 is further configured to allow washing medium 500 to flow throughout said interior volume and to bring washing medium 610 in contact with starting material 500. First separation chamber 210 is coupled to a second separation chamber 220 near said elevated second end of first separation chamber 210 such that material contained within the interior volume of first separation chamber 210 at said elevated second end of first separation chamber 210 may be communicated into a lower first end of second separation chamber 220.

Washing medium supply reservoir 600 may also communicate washing medium 610 to an elevated second end of second separation chamber 220. A second separation chamber agitation member 221 is configured to cause material received from first separation chamber 210 to traverse an interior volume of second separation chamber 220 from the lower first end toward said elevated second end. Agitation member 221 is further configured to allow washing medium 610 to flow throughout said interior volume and to bring washing medium 610 in contact with the material received from first separation chamber 210. Second separation chamber 220 is coupled to a first rinse chamber 310 near said elevated second end of second separation chamber 220 such that material contained within the interior volume of second separation chamber 220 at said elevated second end of second separation chamber 220 may be communicated in a lower first end of first rinse chamber 310.

Water supply reservoir 700 communicates water to an elevated second end of first rinse chamber 310. A first rinse chamber agitation member 311 is configured to cause material received from second separation chamber 220 to traverse an interior volume of first rinse chamber 310 from the lower first end toward said elevated second end. Agitation member 311 is further configured to allow water to flow throughout said interior volume and to bring water in contact with the material received from second separation chamber 220. First rinse chamber 310 is coupled to a second rinse chamber 320 near said elevated second end of first rinse chamber 310 such that material contained within the interior volume of first rinse chamber 310 at said elevated second end of first rinse chamber 310 may be communicated in a lower first end of second rinse chamber 320.

Water supply reservoir 700 may also communicate water to an elevated second end of second rinse chamber 320. A second rinse chamber agitation member 321 is configured to cause material received from first rinse chamber 310 to traverse an interior volume of second rinse chamber 320 from the lower first end toward said elevated second end. Agitation member 321 is further configured to allow water to flow throughout said interior volume and to bring water in contact with the material received from first rinse chamber 310. Second rinse chamber 320 is coupled to receiving vessel 800 near said elevated second end of second rinse chamber 320 such that material contained within the interior volume of second rinse chamber 320 at said elevated second end of second rinse chamber 320 may be communicated into receiving vessel 800.

First separation chamber 210, second separation chamber 220, first rinse chamber 310, and second rinse chamber 320 may all be of a substantially identical design and configuration varying only as described above with respect to whether washing medium 610 or water enters via the chambers' respective elevated ends. In the embodiment depicted in FIGS. 1-3 and 5, the chambers are coupled such that the preceding, feeding chamber's elevated second end is higher than the receiving chamber's lower first end. In this way, gravity serves to facilitate the communication of material between chambers. Additionally, first separation chamber 210, second separation chamber 220, and first rinse chamber 310 may also be coupled to receiving vessel 800. As depicted in FIG. 1, as material is communicated between chambers 210, 220, 310, a component of this material (such as oil, washing medium, and/or water) may be diverted and drained off into receiving vessel 800 rather than flow directly into another chamber. These material components may be diverted by way of a pipe or other drain coupled between receiving vessel 800 and chambers 210, 220, 310 at a position near the chambers' respective elevated second end.

Each of agitation members 211, 221, 311, 321 can be a helical (or screw) conveyor 900 housed within chambers 210, 220, 310, 320 and configured to communicate, via rotation of the helical conveyor, a material, either starting material 500 or material received from one of chambers 210, 220, 310, 320, and washing medium 610 or water through the interior volume of chambers 210, 220, 310, 320. In a preferred embodiment, helical conveyor 900 has elongated flutes 910 which ensure that material does not travel up through the interior volume of the respective chambers too quickly thereby allowing for additional contact with washing medium 610 or water. Elongated flutes 910 are arranged to grow progressively closer together along a length of helical conveyor 900 which starts from a first conveyor end located at the lower first end of a chamber and terminates at a second conveyor end at the elevated second end of a chamber. Elongated flutes 910 are spaced along helical conveyor 900 approximately 0.5 in. away from a central shaft 920 of helical conveyor 900. This allows for materials to flow between elongated flutes 910 and central shaft 920 back down toward the lower first end of a chamber. This "rerun" effect gives starting material 500 a chance to spend more time in chambers 210, 220, 310, 320 resulting in a cleaner product.

In this embodiment, washing medium 610 is d-Limonene. In further embodiments, citric acid may be utilized to supplement washing medium 610.

Receiving vessel 800 is configured to facilitate the separation of components of material communicated from chambers 210, 220, 310, 320. As material enters receiving vessel 800, heavier particles including sediment of dirt, sand, or clay migrate naturally to the base of receiving vessel 800. Any water will settle above the heavier particles. Remaining washing medium, which itself has a lower density than water, will cause any remaining oil to effectively float on the water thereby facilitating subsequent separation of the oil and washing medium. The remaining oil and washing medium will be directed to flow over at least one weir screen into an oil and washing medium catch basin 820. In certain embodiments, multiple weir screens may be used and arranged such that any oil must travel in a substantially zig-zag motion while floating atop the water thereby allowing more time for heavier particles to fall out. The weirs may also have some perforated metal designed to keep heavier particles from migrating across receiving vessel 800 and into a water catch basin 810. The heavier particles may be pulled out from under the water with "buckets" as known in the art. These particles will be moisture wet and free of oil.

An oil and washing medium pump may be configured to communicate any remaining oil and washing medium from oil and washing medium catch basin 820 through a heater 1000 and into a vacuum column 1010. The heat required to produce and recover washing medium vapor is, under vacuum, less than 160° F. Hydrocarbons will fall to the bottom of vacuum column 1010 from where they may be drained or pumped into a recovered oil vessel 1020. Any recovered washing medium vapor from the heating in heater 1000 that is captured in vacuum column 1010 may also be communicated through a heat exchanger 1030 that is configured to cool the vapor and return the washing medium to a liquid state. Once in a liquid state, the recovered washing medium may then be vacuumed into washing medium recovery vessel 1040. Alternatively, the recovered washing medium may be routed into a standby recovery vessel 1050, then into a vacuum volume vessel 1060, and ultimately through a vacuum pump 1070 having a muffler or dropout to catch any vacuum oil (used to operate vacuum pump 1070). As a result of this process, air may be discharged from the muffler.

The recovered water in receiving vessel 800 is channeled under oil and washing medium basin 820 and naturally gravitates toward water catch basin 810. Water remains in watch catch basin 810 until a threshold level is reached at which point a portion of the recovered water may be pumped into a reserve water reservoir 1100. If the water level in water supply reservoir 700 recedes to an undesirable level, additional water may be pumped into it from reserve water reservoir 1100. Water from reserve water reservoir 1100 is filtered on the way to water supply reservoir 700.

As described above, and depicted in FIGS. 1-5, in certain embodiments of the present invention, filtered water and clean, recovered washing medium continuously recirculate during operation of the system. Furthermore, the system may be installed on a portable platform and scaled as needed for particular applications or processing needs.

Although the invention has been explained in relation to various embodiments thereof, it is to be understood that many other possible modifications and variations can be made without departing from the spirit and scope of the invention.

The invention claimed is:

1. A system for extracting hydrocarbons comprising:
 a substantially cylindrical first separation chamber having a first agitation member, wherein said first agitation member comprises a central shaft and a helical surface disposed around said central shaft, wherein said helical surface is positioned a first distance away from said central shaft creating an opening between said central shaft and an interior edge of said helical surface, wherein said helical surface further comprises a plurality of elongate flutes, said plurality of elongate flutes being arranged such that there is an initial distance between each flute of said plurality of flutes at a first end of said central shaft and a terminal distance between said each flute of said plurality of flutes at a second end of said central shaft, said initial distance being larger than said terminal distance;
 a washing medium supply reservoir in fluid communication with said first separation chamber and configured to communicate a washing medium to said first separation chamber;
 a substantially cylindrical second separation chamber having a second agitation member, wherein said agitation member is substantially identical to said first agitation member, said second separation chamber being operably coupled to said first separation chamber, said washing medium supply reservoir being in fluid communication with said second separation chamber and configured to communicate said washing medium to said second separation chamber;
 a substantially cylindrical first rinse chamber having a third agitation member that is substantially identical to said first agitation member, wherein said first rinse chamber is operably coupled to said second separation chamber;
 a water supply reservoir in fluid communication with said first rinse chamber; and
 a substantially cylindrical second rinse chamber having a fourth agitation member that is substantially identical to said first agitation member, wherein said second rinse chamber is operably coupled to said first rinse chamber, said water supply reservoir being in fluid communication with said second rinse chamber, said second rinse chamber being operably coupled to a separated material receptacle.

2. The system of claim 1 wherein said washing medium is d-Limonene.

3. The system of claim 1 wherein said first distance is 0.5 inches.

4. The system of claim 1 wherein said separated material receptacle comprises:
 a separated fluid basin; and
 at least one filtration element configured to direct a fluid from said second rinse chamber to said separated fluid basin.

5. The system of claim 4 wherein said fluid comprises said washing medium.

6. The system of claim 5 further comprising:
 a fluid heating element;
 a first fluid pathway between said separated fluid basin and said fluid heating element;
 a fluid separation vessel configured to receive a volume of vapor generated by said fluid heating element;
 a cooling element configured to return said volume of vapor into a volume of said washing medium in fluid form; and
 a second fluid pathway between said cooling element and said washing medium supply reservoir.

7. A system for extracting hydrocarbons comprising:
 a substantially cylindrical first separation chamber having a first agitation member, wherein said first agitation member comprises a central shaft and a helical surface disposed around said central shaft, wherein said helical surface is positioned a first distance away from said central shaft creating an opening between said central shaft and an interior edge of said helical surface;
 a washing medium supply reservoir in fluid communication with said first separation chamber and configured to communicate a washing medium to said first separation chamber; and
 a separated material receptacle operably coupled to said first separation chamber, wherein said separated material receptacle comprises:
 a separated fluid basin;
 at least one filtration element configured to direct a fluid received from said first separation chamber to said separated fluid basin, wherein said fluid comprises said washing medium;
 a fluid heating element;
 a first fluid pathway between said separated fluid basin and said fluid heating element;
 a fluid separation vessel configured to receive a volume of vapor generated by said fluid heating element;
 a cooling element configured to return said volume of vapor into a volume of said washing medium in fluid form; and
 a second fluid pathway between said cooling element and said washing medium supply reservoir.

* * * * *